(No Model.) 4 Sheets—Sheet 1.
W. F. LAWRENZ.
ADDING MACHINE.
No. 456,419. Patented July 21, 1891.
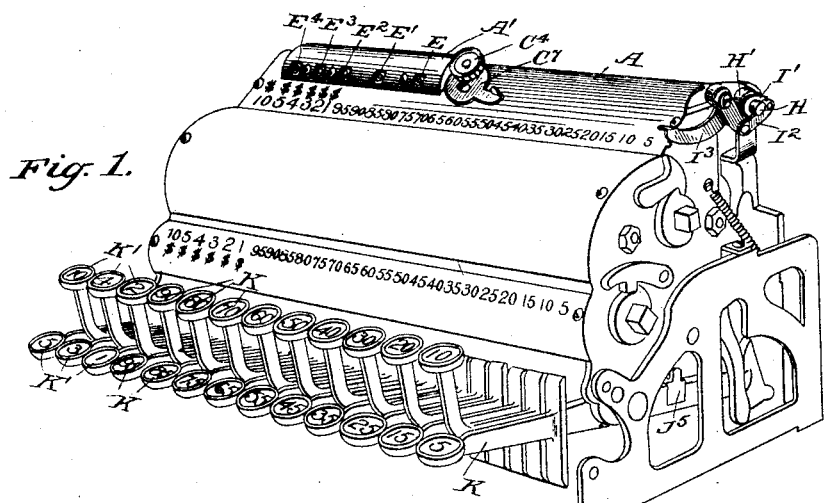
Fig. 1.
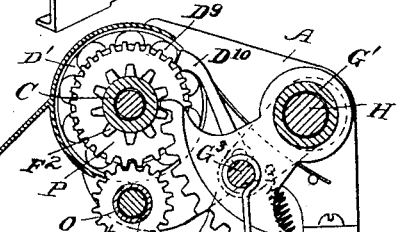
Fig. 2.
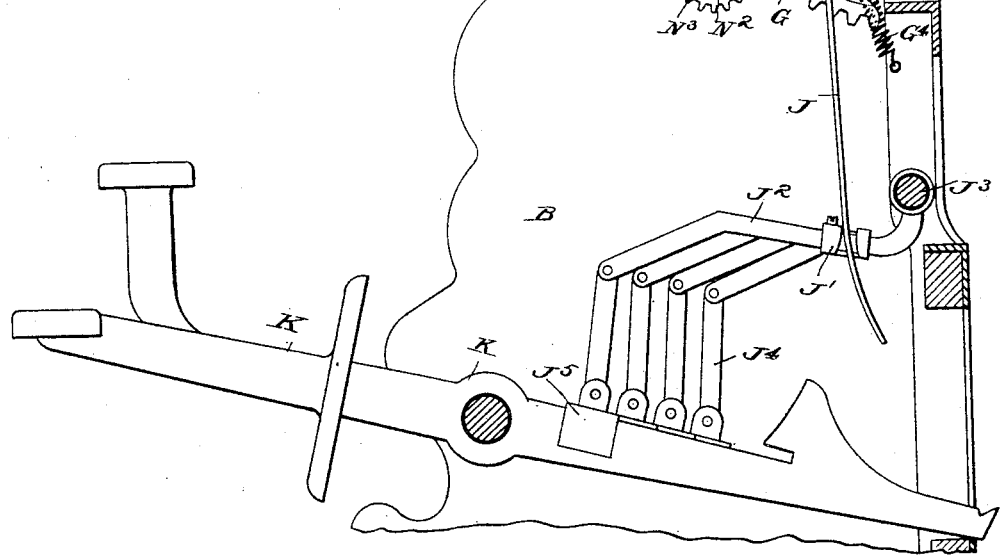
Fig. 22.
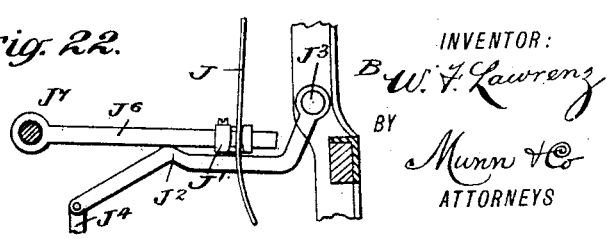
WITNESSES:
J. A. E. Criswell
C. Sedgwick
INVENTOR:
W. F. Lawrenz
BY
Munn & Co.
ATTORNEYS (No Model.) W. F. LAWRENZ. 4 Sheets—Sheet 2.
ADDING MACHINE.

No. 456,419. Patented July 21, 1891.

WITNESSES:

INVENTOR:
W. F. Lawrenz
BY Munn & Co
ATTORNEYS (No Model.) 4 Sheets—Sheet 3.
W. F. LAWRENZ.
ADDING MACHINE.
No. 456,419. Patented July 21, 1891.
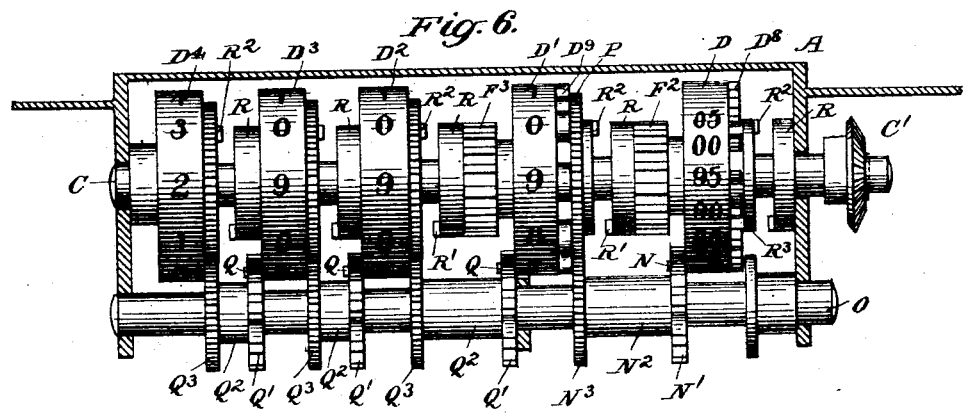
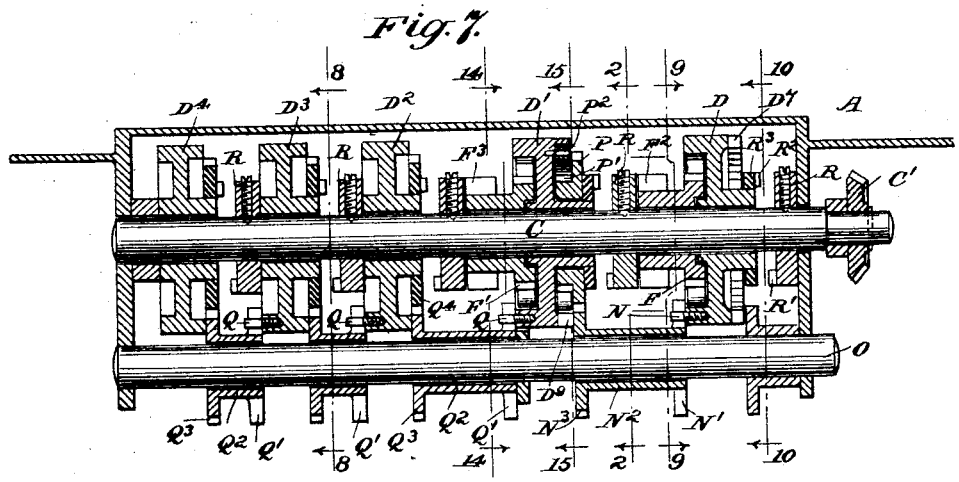
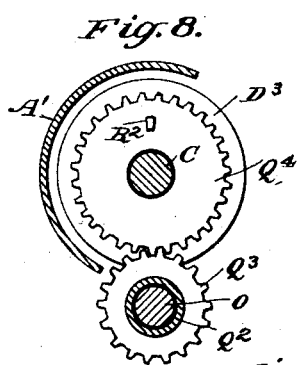
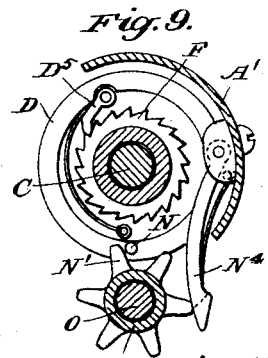
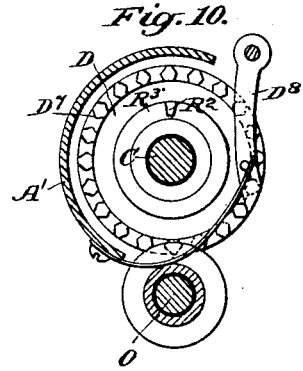
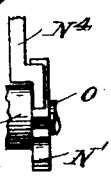
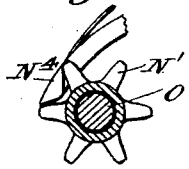
WITNESSES:
J. A. E. Criswell
E. Sedgwick
INVENTOR:
W. F. Lawrenz
BY
Munn & Co.
ATTORNEYS (No Model.) 4 Sheets—Sheet 4.
W. F. LAWRENZ.
ADDING MACHINE.
No. 456,419. Patented July 21, 1891.
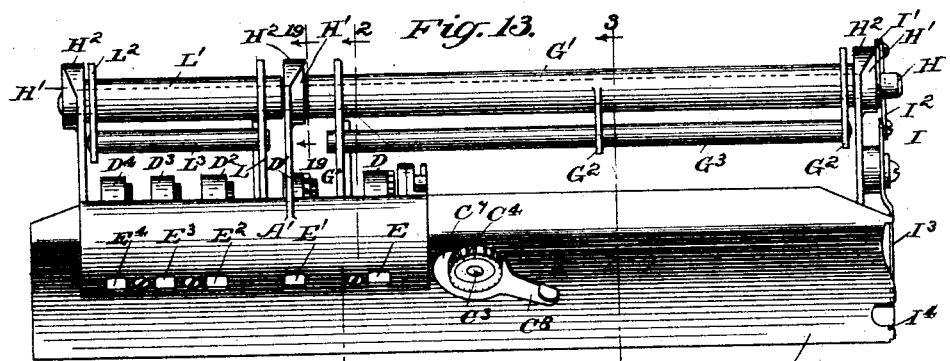
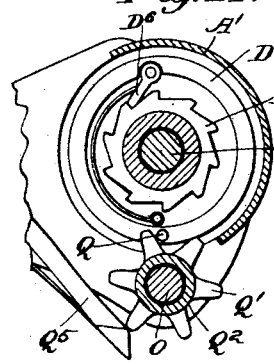
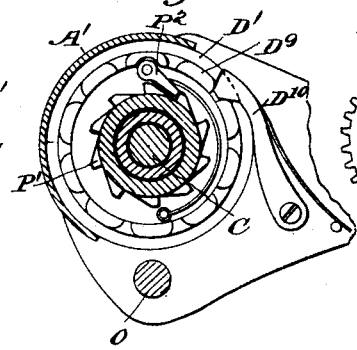
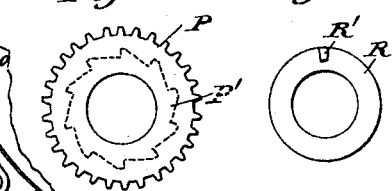
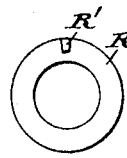
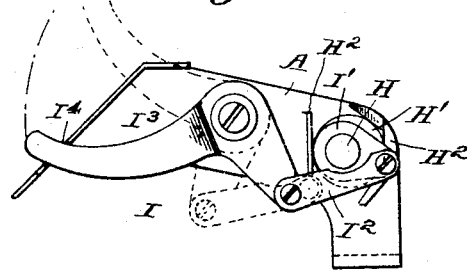
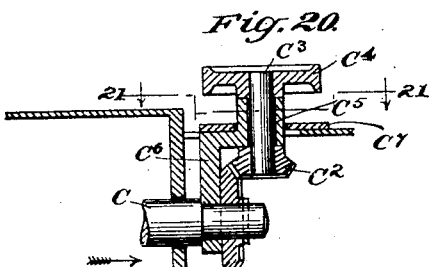
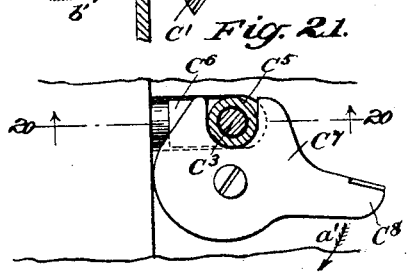
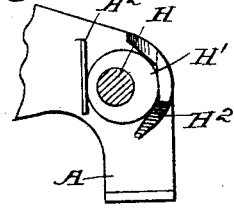
WITNESSES:
J. A. Criswell
C. Sedgwick
INVENTOR:
W. F. Lawrenz
BY
Munn & Co.
ATTORNEYS
THE NORRIS PETERS CO., PHOTO-LITHO., WASHINGTON, D. C.

UNITED STATES PATENT OFFICE.

WILLIAM F. LAWRENZ, OF DULUTH, MINNESOTA.

ADDING-MACHINE.

SPECIFICATION forming part of Letters Patent No. 456,419, dated July 21, 1891.

Application filed September 25, 1890. Serial No. 366,107. (No model.)

*To all whom it may concern:*

Be it known that I, WILLIAM F. LAWRENZ, of Duluth, in the county of St. Louis and State of Minnesota, have invented a new and Improved Adding-Machine, of which the following is a full, clear, and exact description.

The invention is specially intended for use on cash registers and indicators, such as shown and described in the United States Letters Patent No. 382,552, granted to J. H. Patterson on the 8th of May, 1888.

The object of the invention is to provide a new and improved adding-machine which is simple and durable in construction and adapted to register the exact total amount of money in the till or drawer of a cash register and indicator, or when differently set to register the amount of money registered by the cash-register each day, week, or month.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 3:
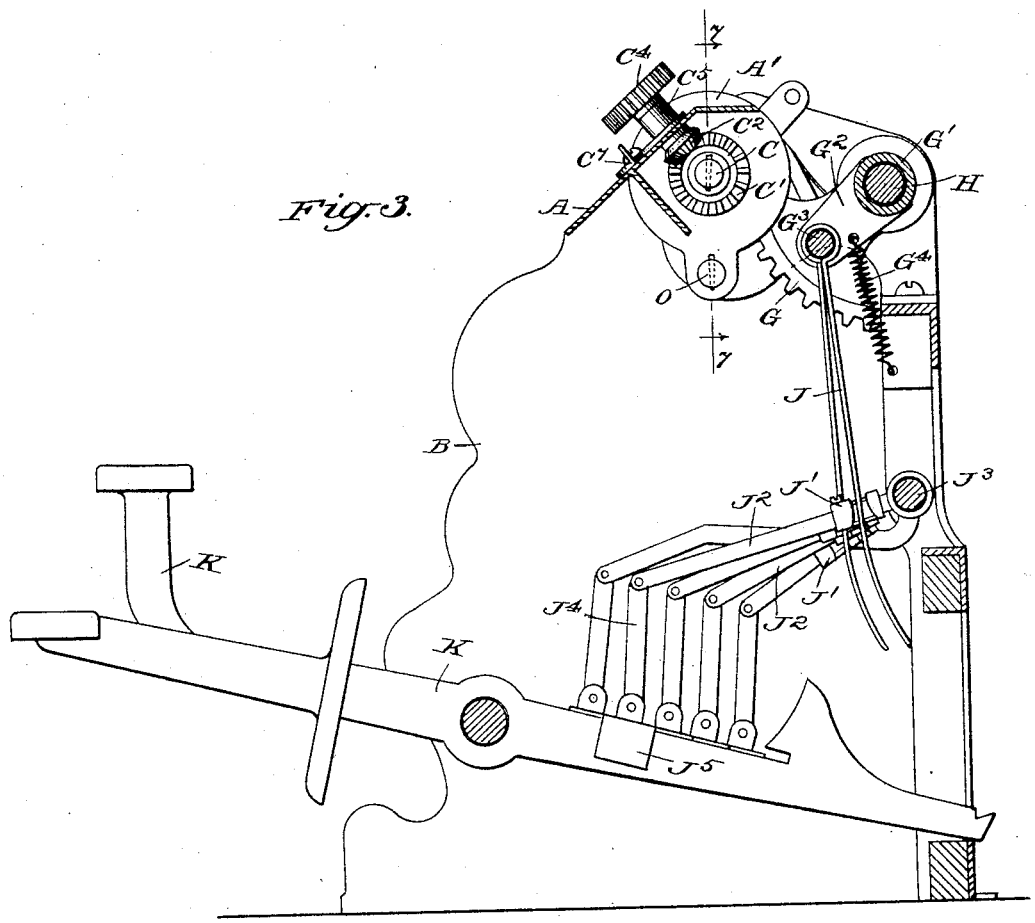
Figure 4:
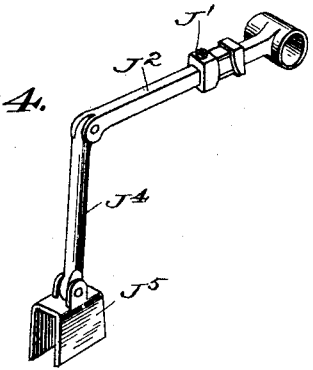
Figure 5:
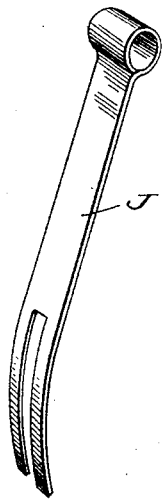

Figure 1 is a perspective view of the improvement as applied to a cash register and indicator. Fig. 2 is an enlarged transverse section of the improvement on the line 2 2 of Figs. 7 and 13 as connected with the keys of the cash-register, the other parts of the latter being omitted. Fig. 3 is a like view of the same on the line 3 3 of Fig. 13 as applied to a cash-register. Fig. 4 is a perspective view of one of the levers connecting with the register-keys. Fig. 5 is a similar view of one of the arms connecting with the levers. Fig. 6 is an enlarged front view of the improvement with the casing in section. Fig. 7 is a longitudinal section of the same on the line 7 7 of Fig. 3. Fig. 8 is a transverse section of the same on the line 8 8 of Fig. 7. Fig. 9 is a like view of the same on the line 9 9 of Fig. 7. Fig. 10 is a similar view of the same on the line 10 10 of Fig. 7. Fig. 11 is a side elevation of a locking mechanism. Fig. 12 is a sectional face view of the same. Fig. 13 is a plan view of the improvement. Fig. 14 is an enlarged transverse section of the same on the line 14 14 of Fig. 7. Fig. 15 is a similar view of the same on the line 15 15 of Fig. 7. Fig. 16 is a face view of one of the gear-wheels. Fig. 17 is a similar view of one of the collars. Fig. 18 is an end view of the mechanism for shifting the shaft. Fig. 19 is a sectional end view or part of the same. Fig. 20 is a sectional front view of part of the mechanism on the line 20 20 in Fig. 21. Fig. 21 is a sectional plan view of the same on the line 21 21 in Fig. 20, and Fig. 22 is a sectional side elevation of a modified form of the connection with the register-keys.

The improved adding-machine is mounted in a suitably-constructed casing A, which may be formed integrally with the casing of the cash register and indicator B, or which may be formed separate from the latter and fastened to the frame of the same, as illustrated in the drawings.

In the frame A is journaled a longitudinally-extending shaft C, on which are mounted to turn loosely the registering-wheels D, D', $D^2$, $D^3$, and $D^4$, of which the wheel D is provided on its rim with consecutive numerals indicating the multiples of 5 from 00 to 95, the wheel D' is provided with the units-dollar numerals from 0 to 9, the wheel $D^2$ is provided with the tens-dollar numerals from 0 to 9, the wheel $D^3$ is provided with the hundreds-dollar numerals from 0 to 9, and the wheel $D^4$ is provided on its rim with the thousands-dollar numerals from 0 to 9. The several wheels D, D', $D^2$, $D^3$, and $D^4$ are adapted to show one of their numerals at a time through the openings E, E', $E^2$, $E^3$, and $E^4$, formed in a segmental part A' of the casing A. On one face of the multiple-wheel D and the units-dollar wheel D' is pivoted a spring-pressed pawl $D^5$ and $D^6$, respectively, engaging ratchet-wheels F F', respectively, mounted to turn loosely on the main shaft C, and of which the ratchet-wheel F is provided with a number of teeth corresponding to the multiple numerals on the wheel D, while the other ratchet-wheel F' is provided with ten teeth corresponding with the numerals 0 to 9 on the units-dollar wheel D'.

On the ratchet-wheels F and F' are formed the gear-wheels $F^2$ and $F^3$, respectively, Fig. 7, of which the gear-wheel $F^2$ is in mesh with a segmental gear-wheel G, formed on a sleeve G', mounted to turn loosely on a shaft H, carrying eccentrics H', Fig. 19, mounted to turn in fixed bearings H², arranged on the main frame A. A suitable mechanism I, hereinafter more fully described, serves to shift the eccentrics H', so as to throw the shaft H forward or backward, in order to engage or disengage the segmental gear-wheel G with or from the gear-wheel F².

On the sleeve G' are formed a number of arms G², in which and the segment G is supported a rod G³, on which are pivoted downwardly-extending arms J, corresponding in number to the number of multiple numerals on the wheel D. Each of the arms J (see Fig. 5) is provided at its lower end with a fork straddling a saddle J', held adjustably on a lever J², fulcrumed on a fixed rod J³, secured in the frame of the cash-register B. The free end of each lever J² is pivotally connected by a link J⁴ with a clamp J⁵, fitted onto the lever K of the cash register and indicator. It is understood that the levers K correspond in number to the multiple numerals on the wheel D and are marked accordingly, as is plainly illustrated in Fig. 1. The levers K when pressed actuate the cash register and indicator in the usual manner by suitable connections, and are also intended to actuate the adding-machine simultaneously, so that the amount represented by one of the pressed keys and registered by the cash-register is added to amounts previously indicated by the adding-machine.

The saddle J' and the clamp J⁵ are made adjustable on the levers J² and K, respectively, so as to regulate the throw of the arms J, each of which latter has a different throw, according to the lever K, with which it is connected. The lever K, representing five cents, is connected with the arm J by the link J⁴, the lever J², and the saddle J', so that the throw of the said arm J is only sufficient to move the segmental gear-wheel G far enough to turn the wheel D the distance between two numerals, so that the next multiple of 5 appears through the opening E, showing that five cents have been added to the till or drawer and registered by the cash-register. The lever K, representing ten cents, is connected with its arm J in such a manner that the latter moves somewhat farther than the arm for the five-cent key, so that the segmental gear-wheel G turns the gear-wheel F² a sufficient distance to cause the ratchet-wheel to impart movement by the pawl D⁵ to the wheel D, so that the latter turns the distance between three numerals, and the second following higher numeral appears in the opening E, thus showing that ten cents have been added. In the same manner the remaining keys K are connected by the links J⁴, the levers J², and the saddles J' with the arms J, in order to increase the throw of the said arms, according to the respective higher value of the keys.

The key marked "95" imparts when pressed the longest stroke to its arm J, so that the segmental gear-wheel G turns the multiple-wheel D accordingly, and the corresponding number appears, showing that ninety-five cents have been added to the amount previously seen through the opening E. The sleeve G' and its arm G² and segmental gear-wheel G are always returned to their former position by a suitable spring G⁴. (See Fig. 3.) A segmental gear-wheel L, Fig. 13, similar to the segmental gear-wheel G, is in mesh with the gear-wheel F³ on the ratchet-wheel F', the said segmental gear-wheel being formed on the sleeve L', mounted to turn loosely on the shaft H, which also carries the sleeve G. The sleeve L is provided with an arm L², in which and the segment L is supported a rod L³, on which is fulcrumed a set of arms J, similar to the set of arms J, previously mentioned, and similarly connected with a corresponding set of keys K', representing dollars from one to five and one key marked "$10." When the key of the set of keys K', marked "1," is pressed, the segmental gear-wheel L is moved, so as to turn the gear-wheel F³ and the ratchet-wheel F' sufficiently, so that the pawl D⁶, engaging the ratchet-wheel F', moves the wheel D' the distance between two numerals, whereby the next following numeral appears in the opening E'. When the key marked "5" of the set of keys K' is pressed, the wheel D' is turned the distance of five numerals, so that a numeral appears in the opening E', showing that five dollars have been added to the previous amount. When the key marked "10" of the set of keys K' is pressed, the wheel D' makes an entire revolution, so that the same figure again appears in the opening E'.

In the modification shown in Fig. 22 the arm J is connected with a saddle J', held adjustable on a lever J⁶ instead of lever J², which latter engages the under side of the lever J⁶, and when actuated by the key K swings the lever J⁶ and the arm J upward. The several levers J⁶ are all fulcrumed on a rod J⁷, located opposite the rod J³, held in the frame of the cash-register B.

The transmission of the dollars from the wheel D to the wheel D', from the units-dollar wheel D' to the tens-dollar wheel D², and from the latter to the hundreds-wheel D³, and then to the thousands-wheel D⁴ is arranged as follows: On the face of the wheel D is secured a pin N, adapted to engage a gear-wheel N', so as to turn the latter the distance of one tooth for every revolution the wheel D makes. The wheel N' is formed on a hub N², mounted to turn loosely on a shaft O, journaled in the main frame A. On the hub N² is secured a gear-wheel N³, which meshes into a gear-wheel P, mounted to turn loosely on the hub of the unit-wheel D', as is plainly illustrated in Figs. 7 and 15. On the face of the gear-wheel P is formed a ratchet-wheel P', adapted to be engaged by a spring-pressed pawl P², pivoted on one face of the unit-wheel D', so that when the said gear-wheel P is turned its motion is transmitted to the unit-wheel D' by the ratchet-wheel P' and the pawl P². The pin N moves the gear-wheel N' the distance of one tooth, then the unit-wheel is turned sufficiently so as to bring its next numeral into the opening E', showing that the wheel D has completed its revolution and passed the numeral "95" in the opening E. A spring-pressed pawl N⁴ is adapted to engage the ratchet-wheel N', so as to lock the latter in place until again moved by the pin N. A pin Q, similar to the pin N, is arranged on the unit-wheel D', and is adapted to engage the gear-wheel Q', mounted by its hub Q² on the shaft O. When the wheel D' makes one revolution, its pin Q moves the gear-wheel Q' the distance between two teeth. On the hub Q² is formed a gear-wheel Q³ in mesh with the gear-wheel Q⁴, secured on the face of the wheel D², so that the latter is turned from one numeral to the next at every revolution of the wheel D'. Transmission by similar means takes place from the wheel D² to the wheel D³, and from the latter to the wheel D⁴. In order to prevent the multiple-wheel D from accidentally changing its position it is provided on its face with teeth D⁷, engaged by a spring-pressed pawl D⁸, fulcrumed on the frame A. Similar teeth D⁹ are formed on the wheel D' and engaged by a spring-pressed pawl D¹⁰ for the same purpose.

In order to return at any time the wheels D, D', D², D³, and D⁴ to their "0" position, the following device is provided: On the reduced end of the shaft C is secured a bevel gear-wheel C' in mesh with a bevel gear-wheel C², secured on a shaft C³, carrying a hand-wheel C⁴, extending to the top of the frame A. The shaft C³ is journaled in a bearing C⁵, formed in an arm C⁶, engaging the shaft C at its reduced end, as is plainly shown in Fig. 20, so that when the said arm is moved longitudinally a similar movement is given to the shaft C. The bearing C⁵ is engaged in a lever C⁷, fulcrumed on top of the main frame A and provided with a handle end C⁸, which, shifted in the direction of the arrow a', (see Fig. 21,) causes the shaft C to slide in the reverse direction of the arrow b', and by reversing the movement of the lever C⁴ a reverse movement of the shaft C takes place. On the shaft C are secured a number of disks R, each provided on its face with a pin R', adapted to engage a corresponding pin or lug R², secured either on a separate disk R³, fastened on the several wheels D, D', D², D³, and D⁴, or the said lug R² is formed directly on the said wheels. When the shaft C is in the position shown in Figs. 6 and 7, the pins R' are disengaged from the pins R²; but when the said shaft is moved in the inverse direction of the arrow b', as previously described, by shifting the lever C⁸, then the said pins R' engage the pins R² when the shaft C is turned, which can be conveniently done by the operator turning the hand-wheel C⁴. The several pins R' then return the several wheels to their "0" position.

The device I, previously mentioned, for shifting the shaft H, carrying the segmental gear-wheels G and L, forward or backward, is as follows: On the shaft H is secured a crank-arm I', pivotally connected by a link I² (see Fig. 18) with a bell-crank lever I³, fulcrumed on one end of the main frame A and adapted to be locked in place by engaging a notch I⁴ on the main frame. When the device I is in the position shown in Fig. 18, then the shaft H is in its innermost position, and the segmental gear-wheels G and L engage their respective gear-wheels F² and F³. When the operator desires to move the several numeral-wheels D, D', D², D³, and D⁴ to a "0" position, then he moves their crank-lever I³ into the position shown in dotted lines in Fig. 18, so that the link I², acting on the arm I', turns the shaft H and consequently the eccentrics H', secured on the said shaft. As the eccentrics H' turn in the fixed bearings H², the shaft H is carried rearward, thus moving the segmental gear-wheels G and L out of mesh with the gear-wheels F² and F³, respectively.

The operation is as follows: When the machine is set at "0," then the numerals "0" of the wheels D, D', D², D³, and D⁴ appear in the openings E, E', E², E³, and E⁴, respectively. Now, suppose an amount of five cents has been received and deposited in the till, then the operator presses the lever K, marked "5," so that the cash register and indicator B registers and indicates "5." At the same time the multiple-wheel D of the adding-machine changes its position, so that the numeral "5" appears through the opening E. When the operator receives as the next sum, say, fifteen cents, then the key K, marked "15," is pressed, the amount "15" is indicated and registered by the cash-register B, and at the same time the multiple-wheel D is shifted, so that the numeral "20" appears in the opening E, thus showing the total amount in the till—that is, twenty cents. If at a third sale two dollars are received, the operator presses the key K marked "2," whereby two dollars is indicated and registered by the cash register and indicator, and at the same time the wheel D' is turned the distance of two numerals, so that the numeral "2" appears in the opening E'. By reading the numerals in the openings E' and E the amount of two dollars and twenty cents is shown—that is, the entire amount deposited in the till. If at the fourth sale the amount of ninety-five cents is received, the operator presses the lever K, marked "95," so that the wheel D is shifted until the numeral "15" appears in the opening E—that is, the wheel D has made more than one revolution, and by its pin N, acting on the gear-wheel N', shifts the latter, so that the wheel D' is turned by the means previously described, whereby the next numeral "3" appears in the opening E'. The entire amount in the till can now be read in the openings E' and E, being three dollars and fifteen cents. Thus it will be seen that not only the amount of the sales is registered by the cash-register B, but the several sales, or the amounts deposited in the till, are registered by the adding-machine. When the operator desires to return the several wheels D, D', D², D³, and D⁴ to "0," he first moves the bell-crank lever I³, as previously described, so as to disengage the segmental gear-wheels G and L from the gear-wheels F² and F³, respectively. The operator then shifts the lever C⁸ to slide the shaft C to the left in the inverse direction of the arrow b', then turns the hand-wheel C⁴, so that the shaft C is turned, and by the pins or lugs R', engaging the pins or lugs R², turns the numeral-wheels to the "0" position. When this has been accomplished, the lever C⁸ is moved back to its normal position, disengaging the pins R' from the pins R². The bell-crank lever I³ is then moved back to its normal position, so that the segmental gear-wheels G and L again engage the gear-wheels F² and F³, and the machine is again ready for use. It will be seen that by shifting the numeral-wheels back to their "0" position at the end of a day, week, or month the entire amount of the day's, week's, or month's sales is recorded by the adding-machine, provided the amount does not reach ten thousand dollars. If it is desired to add higher sums, additional ten-thousand-dollar wheels and one-hundred-thousand-dollar wheels are added to the machine.

Having thus fully described my invention, I claim as new and desire to secure by Letters Patent—

1. In an adding-machine, the combination, with a multiple-wheel carrying a pawl, of a ratchet-wheel engaged by the said pawl and provided with a gear-wheel, a segmental gear-wheel adapted to be turned and in mesh with the said ratchet gear-wheel, a series of arms connected with the said segmental gear-wheel to turn the same, and a series of keys connected with the said arms to move the said segmental gear-wheel more or less, according to the key pressed, substantially as shown and described.

2. In an adding-machine, the combination, with a multiple-wheel carrying a pawl, of a ratchet-wheel engaged by the said pawl and provided with a gear-wheel, a segmental gear-wheel adapted to be turned and in mesh with the said ratchet gear-wheel, a series of arms connected with the said segmental gear-wheel to turn the same, a series of keys connected with the said arms to move the said segmental gear-wheel more or less, according to the key pressed, and intermediate means, substantially as described, for connecting the said arms with the said keys, as set forth.

3. In an adding-machine, the combination, with a multiple-wheel mounted to turn and provided on one of its faces with a pin, of a toothed wheel mounted to turn and adapted to be engaged by the said pin, a gear-wheel formed integral with the said toothed wheel, a second gear-wheel in mesh with the said first-named gear-wheel and provided on one of its faces with a ratchet-wheel, and a unit-wheel carrying a pawl engaging the said ratchet-wheel, substantially as shown and described.

4. In an adding-machine, the combination, with a numeral-wheel mounted to turn and provided on one of its faces with a pin, of a toothed wheel adapted to be engaged by the said pin, a gear-wheel formed integral with the said toothed wheel, a second gear-wheel in mesh with the said first-named gear-wheel, and a second numeral-wheel carrying rigidly the said second gear-wheel, substantially as shown and described.

5. In an adding-machine, the combination, with a segmental gear-wheel adapted to actuate a numeral-wheel, of a series of arms connected with the said segmental gear-wheel to turn the same, saddles engaged by the said arms, levers on which the said saddles are held adjustable, and keys connected by links with the said levers, substantially as shown and described.

6. In an adding-machine, the combination, with a shaft mounted to turn and to slide, of a series of disks secured on the said shaft and each carrying on one face a lug or pin, and a series of numeral-wheels mounted to turn loosely on the said shaft and each provided on one of its faces with a pin or lug adapted to be engaged by the pins or lugs on the said disks, substantially as described, so that when the said shaft is turned the several numeral-wheels are brought to their zero position, substantially as shown and described.

7. In an adding-machine, the combination, with a shaft mounted to turn and to slide, of a series of disks secured on the said shaft and each carrying on one face a lug or pin, a series of numeral-wheels mounted to turn loosely on the said shaft and each provided on one of its faces with a pin or lug adapted to be engaged by the pins or lugs on the said disks, substantially as described, so that when the said shaft is turned the several numeral-wheels are brought to their zero position, and means, substantially as described, for turning and sliding the said shaft, as set forth.

8. In an adding-machine, the combination, with a shaft mounted to turn and to slide, of a series of disks secured on the said shaft and each carrying on one face a lug or pin, a series of numeral-wheels mounted to turn loosely on the said shaft and each provided on one of its faces with a pin or lug adapted to be engaged by the pins or lugs on the said disks, substantially as described, so that when the said shaft is turned the several numeral-wheels are brought to their zero position, a second shaft geared with the said first-named shaft, and a bearing fitted to slide and carrying the said second shaft and also connected with the said first-named shaft to move the shaft in its bearings, substantially as shown and described.

9. In an adding-machine, the combination, with a shaft mounted to turn and to slide, of a series of disks secured on the said shaft and each carrying on one face a lug or pin, a series of numeral-wheels mounted to turn loosely on the said shaft and each provided on one of its faces with a pin or lug adapted to be engaged by the pins or lugs on the said disks, substantially as described, so that when the said shaft is turned the several numeral-wheels are brought to their zero position, a second shaft geared with the said first-named shaft, a bearing fitted to slide and carrying the said second shaft and also connected with the first-named shaft to move the shaft in its bearing, and a lever engaging the said second shaft-bearing to move the latter longitudinally, as set forth.

10. In an adding-machine, the combination, with a shaft mounted to turn and to slide, of a series of disks secured on the said shaft and each carrying on one face a lug or pin, a series of numeral-wheels mounted to turn loosely on the said shaft and each provided on one of its faces with a pin or lug adapted to be engaged by the pins or lugs on the said disks, substantially as described, so that when the said shaft is turned the several numeral-wheels are brought to their zero position, a second shaft geared with the said first-named shaft, a bearing fitted to slide and carrying the said second shaft and also connected with the said first-named shaft to move the shaft in its bearing, and a hand-wheel secured on the said second shaft to turn the same, substantially as shown and described.

WILLIAM F. LAWRENZ.

Witnesses:
H. P. PETRE,
THOS. E. COLLINS.